United States Patent
Lee et al.

(10) Patent No.: US 9,099,710 B2
(45) Date of Patent: Aug. 4, 2015

(54) BATTERY CONTAINER, SUB-BATTERY CONTAINER USED THEREIN, AND BATTERY PACK USING THE SAME

(71) Applicant: LG CHEM, LTD., Seoul (KR)

(72) Inventors: Bum-Hyun Lee, Seoul (KR); Mi-Jung Park, Seoul (KR)

(73) Assignee: LG CHEM, LTD., Seoul (KR)

( * ) Notice: Subject to any disclaimer, the term of this patent is extended or adjusted under 35 U.S.C. 154(b) by 28 days.

(21) Appl. No.: 13/959,303

(22) Filed: Aug. 5, 2013

(65) Prior Publication Data

US 2013/0316212 A1 Nov. 28, 2013

Related U.S. Application Data

(63) Continuation of application No. PCT/KR2012/003180, filed on Apr. 25, 2012.

(30) Foreign Application Priority Data

Apr. 25, 2011 (KR) .................... 10-2011-0038369

(51) Int. Cl.
*H01M 2/10* (2006.01)
*H01M 2/02* (2006.01)

(52) U.S. Cl.
CPC .......... *H01M 2/1016* (2013.01); *H01M 2/0245* (2013.01); *H01M 2/1022* (2013.01); *H01M 2/1061* (2013.01); *H01M 2/1072* (2013.01); *H01M 2/1077* (2013.01)

(58) Field of Classification Search
USPC ........................................... 429/99
See application file for complete search history.

(56) References Cited

U.S. PATENT DOCUMENTS

| | | | |
|---|---|---|---|
| 3,623,917 A | 11/1971 | Chassoux | |
| 4,056,295 A | 11/1977 | Downing | |
| 6,326,103 B1 * | 12/2001 | Ido et al. | 429/156 |
| 6,451,475 B1 | 9/2002 | Sherwood | |
| 7,976,980 B2 | 7/2011 | Yoon et al. | |
| 2001/0026886 A1 * | 10/2001 | Inui et al. | 429/120 |
| 2006/0152906 A1 | 7/2006 | Miller | |
| 2007/0264562 A1 | 11/2007 | Kang et al. | |

(Continued)

FOREIGN PATENT DOCUMENTS

| | | |
|---|---|---|
| JP | 2001-15090 A | 1/2001 |
| KR | 10-2007-0068608 A | 7/2007 |

(Continued)

*Primary Examiner* — Stewart Fraser
*Assistant Examiner* — Olatunji Godo
(74) *Attorney, Agent, or Firm* — Birch, Stewart, Kolasch & Birch, LLP

(57) ABSTRACT

Disclosed is a battery container, which may stably support a plurality of battery modules received in the battery container and facilitate the stacking and separation of the battery modules, a sub-battery container used therein, and a battery pack using the same. The sub-battery container, includes two side plates standing to face each other at both side walls of the sub-battery container; and horizontal support bars disposed in parallel and so that both longitudinal ends of the horizontal support bars are coupled to the opposing corners of the two side plates, wherein the horizontal support bars include an upper horizontal support bar and a lower horizontal support bar, and the lower horizontal support bar and the upper horizontal support bar have uneven portions capable of coupling to each other at the bottom of the lower horizontal support bar and at the top of the upper horizontal support bar.

13 Claims, 7 Drawing Sheets

(56) References Cited

U.S. PATENT DOCUMENTS

2009/0208827 A1* 8/2009 Kondo ............................ 429/98
2010/0151299 A1 6/2010 Ha et al.
2010/0330404 A1* 12/2010 Nishino et al. .................. 429/82

FOREIGN PATENT DOCUMENTS

| KR | 10-2008-0025429 A | 3/2008 |
| KR | 10-0905393 B1 | 6/2009 |
| WO | WO 98/56054 A1 | 12/1998 |

* cited by examiner

BATTERY CONTAINER, SUB-BATTERY CONTAINER USED THEREIN, AND BATTERY PACK USING THE SAME

CROSS-REFERENCE TO RELATED APPLICATIONS

The present application is a continuation of International Application No. PCT/KR2012/003180 filed Apr. 25, 2012, which claims priority to Korean Patent Application No. 10-2011-0038369 filed in the Republic of Korea on Apr. 25, 2011, the disclosures of which are incorporated herein by reference.

TECHNICAL FIELD

The present invention relates to a technology for receiving a plurality of battery modules, and more particularly, to a battery container, which can stably support a plurality of battery modules received therein and facilitate the stacking and separation of the battery modules, a sub-battery container used therein, and a battery pack using the same.

BACKGROUND ART

In today's society, secondary batteries are widely used in various devices including portable electronic products such as laptop computers, cameras, cellular phones, MP3s as well as cars, robots, satellites or the like. These secondary batteries are extensively used due to their great advantages of being able to repeatedly charge and discharge and store energy.

In particular, with the gradual exhaustion of carbon energies, such as oil, coal and natural gas, and the recent increased interest in the environment, efficient energy consumption has become an important issue. Therefore, many efforts have been made to improve the efficiency of energy consumption and a smart grid system is an example of a result of these efforts.

A smart grid system is an intelligent electric grid system which incorporates an information and communication technology into the production, transfer and consumption process of power, thereby inducing the interaction of power supply and consumption and thus enhancing the efficiency of electricity usage. The amount of electric energy used by a consumer may not always be constant and can frequently change. For example, in the summer time, the electric energy consumption can increase rapidly due to the use of an air conditioner in the afternoon and rapidly decrease later on in the evening. Like above, the amount of electric energy consumed may not always be constant and can frequently change, and even if the power supply is controlled to some degree, it is realistically impossible to meet the varying electric energy consumption amount. Accordingly, the imbalance of the power supply and electric energy consumption may cause an excess or deficiency of the power supply. In order to solve such a problem, a smart grid system checks for the power status in real time to flexibly control the power supply, and a power storage battery pack for storing power is an important component in constructing such a smart grid system. In other words, since a smart grid system is configured to store surplus power when power consumption is low and supply the stored power with supply power to consumers when power consumption is high, a power storage battery pack for storing power is important for the smart grid system.

Such a power storage battery pack may be used in various fields as well as in a smart grid system. For example, a power storage battery pack may be used in electric vehicle (EV) charging stations that store a great amount of power needed to supply EVs.

A power storage battery pack should be provided with a plurality of battery modules to have a capacity larger than a general battery pack used in portable electronic products as well as other various kinds of devices. The plurality of battery modules are received as a multi-layered stack for their space efficiency and connectivity. However, if the plurality of battery modules are stacked without using any kind of container, the weight of the battery modules positioned at the upper layer is directly loaded onto the battery modules positioned at the lower layer, so that the static deflection or permanent deformation of the battery module may occur. In other words, the battery modules are precariously stacked, and the safety of the battery modules is threatened due to the pressure and deformation thereof. Accordingly, a power storage battery pack is conventionally provided with a battery container for receiving a plurality of battery modules. Such a battery container is referred to as a battery holder, a battery tray, or a battery rack.

FIG. 1 is a perspective view schematically showing a conventional battery container.

As shown in FIG. 1, a conventional battery container is configured with a structure, such as an L-type frame 20. That is, a plurality of L-type frames 20 internally divides the battery container into multiple layers by welding or screw-fixing, similar to a bookshelf, and battery modules 10 are received in each layer. The battery container as described above is configured to support the bottom of the battery modules 10 by using a lower structure, such as the L-type frame 20 or a separate bottom plate (not shown).

In the conventional battery container, each structure placed at the bottom of the battery modules should have high strength and be strongly coupled to another structure in order to stably receive the battery modules 10. If not, the battery container may be deformed or destroyed due to the weight of the battery modules 10, and this further causes the battery modules 10 to break. Accordingly, the conventional battery container needs to increase the thickness of its structure or be further provided with a new structure, thereby becoming more complicated.

Moreover, in order to ensure a predetermined or larger amount of supporting force, the structures placed at the bottom of the battery modules should be strongly coupled to other structures of the battery container in the conventional battery container. However, this generates another problem when the battery container changes its shape. For example, if a battery container is configured with three separate layers as shown in FIG. 1, one or more layers are added by replacing four existing L-type frames 20, which are vertically standing in the container, with four new L-type frames 20 which have a height higher than the existing L-type frames. To achieve this, after pulling out the received battery modules 10 from the battery container, it must go through a complicated process of having to not only disassemble the existing L-type frames 20, but also assemble the new L-type frames 20. This complicated process of having to disassemble and assemble the L-type frames 20 must also be performed when having to remove one layer from a battery container having three separate layers, as shown in FIG. 1. Accordingly, the conventional battery container has a problem in that the structural change, which is required for adding a new battery module 10 or removing the existing battery module 10, is complicated and difficult.

DISCLOSURE

Technical Problem

The present invention is designed to solve the problems of the prior art, and therefore it is an object of the present invention to provide a battery container, which can stably support a plurality of battery modules and facilitate the assembling and disassembling of each layer, a sub-battery container used therein, and a battery pack using the same.

Additional aspects and advantages will be apparent from the embodiments of the present invention. The aspects and advantages of the present invention may be realized by means of instrumentalities and combinations particularly pointed out in the appended claims.

Technical Solution

In order to achieve the above-mentioned objects, in accordance with one aspect of the present invention, there is provided a sub-battery container used in a battery container for receiving a plurality of battery modules, the sub-battery container including two side plates standing to face each other at both side walls of the sub-battery container; and horizontal support bars disposed in parallel, so that both longitudinal ends of the horizontal support bars are coupled to the opposing corners of the two side plates, wherein, the horizontal support bars include an upper horizontal support bar and a lower horizontal support bar, and the lower horizontal support bar and the upper horizontal support bar have uneven portions capable of coupling to each other at the bottom of the lower horizontal support bar and at the top of the upper horizontal support bar.

Preferably, the sub-battery container further includes a top plate whose both ends are fixed to the upper horizontal support bars.

In addition, in order to achieve the above-mentioned objects, in accordance with another aspect of the present invention, there is provided a battery container for receiving a plurality of battery modules, including a plurality of sub-battery containers including two side plates standing to face each other at both side walls thereof; and horizontal support bars disposed in parallel, so that both longitudinal ends of the horizontal support bars are coupled to the opposing corners of the two side plates, wherein, the horizontal support bars include an upper horizontal support bar and a lower horizontal support bar, and the horizontal support bar and the upper horizontal support bar have uneven portions capable of coupling to each other at the bottom of the lower horizontal support bar and at the top of the upper horizontal support bar, wherein, the plurality of sub-battery containers are stacked by mutually coupling the uneven portions which are formed at the bottom of the lower horizontal support bars of the upper positioned sub-battery container and at the top of the upper horizontal support bars of the lower positioned sub-battery container.

Preferably, each sub-battery container further includes a top plate whose both ends are fixed to the upper horizontal support bars.

Also, in order to achieve the above-mentioned objects, in accordance with another aspect of the present invention, there is provided a battery pack, including a plurality of battery modules received in a battery container as described above.

Advantageous Effects

According to the present invention, since a sub-battery container used in a battery container has uneven portions capable of mutually coupling to each other at the bottom and the top thereof, one sub-battery container may be stacked on top of another sub-battery container. In other words, a battery container capable of receiving a plurality of battery modules may be easily configured by stacking several independent sub-battery containers. For example, a new sub-battery container may be easily stacked on top of the battery container in order to add a new layer into the battery container, and a sub-battery container may be easily lifted up and removed from the uppermost of the battery container in order to remove a layer from the battery container.

Accordingly, in the present invention, since sub-battery containers which configure each layer in a battery container are coupled to each other without welding or bolt-fixing and each sub-battery container is independently configured to be easily disassembled and assembled, the structural change is easily achieved in the battery container. Not only that, if some of sub-battery containers are broken or deformed in the battery container, the sub-battery containers only need to be removed from the battery container, thereby achieving easy and simple maintenance and repair.

In addition, according to the present invention, even if each sub-battery container is configured with a simple structure, the sub-battery container ensures a supporting force which stably supports a plurality of battery modules. That is, since the sub-battery container includes four horizontal support bars and these spread and support the load of the battery modules, the sub-battery container may stably support the battery modules with no deformation. Moreover, when the sub-battery container is provided with a top plate, the structural stability of the sub-battery container may be firmly maintained.

In particular, the present invention may be effectively applied to configure a large capacity power storage battery pack in which a great number of battery modules are received. Moreover, according to the present invention, since it is simple to change the structure of the battery container, a power storage capacity may be easily changed by adding or removing battery modules.

DESCRIPTION OF DRAWINGS

In order to explain the principle of the present invention, some accompanying drawings related to its preferred embodiments are below for the purpose of illustration and description, although they are not intended to be exhaustive. The drawing figures depict one or more exemplary embodiments in accord with the present concepts, by way of example only, not by way of limitations.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
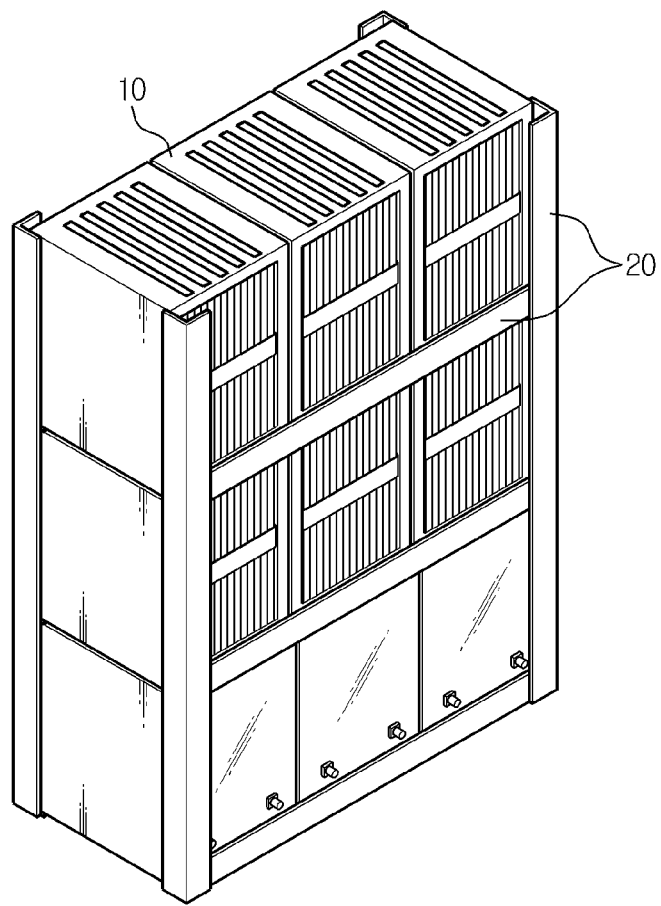
FIG. 1 is a perspective view schematically showing a conventional battery container.
Figure 2:
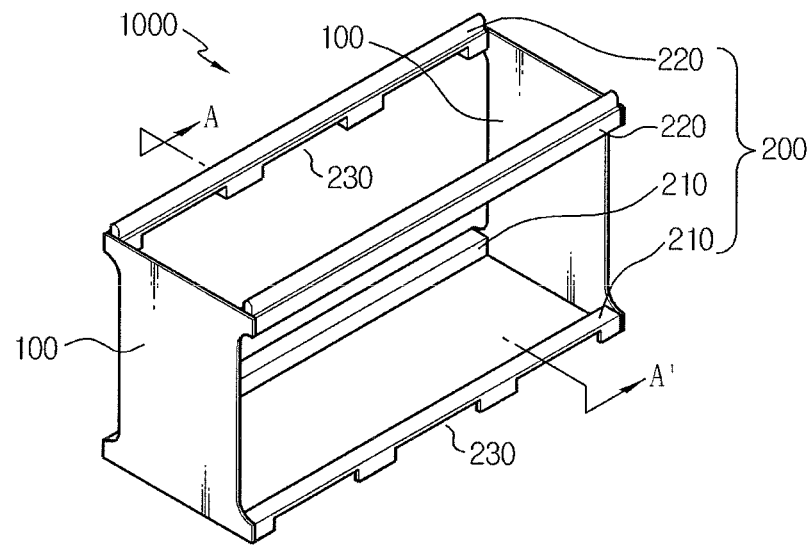
FIG. 2 is a front perspective view schematically showing a sub-battery container used in a battery container according to a preferred embodiment of the present invention.

FIG. 2 is a front perspective view schematically showing a sub-battery container 1000 used in a battery container according to a preferred embodiment of the present invention.

Referring to FIG. 2, the sub-battery container 1000 used in a battery container according to the present invention includes two side plates 100 and four horizontal support bars 200.

The side plates 100 stand to face each other at both side walls of the sub-battery container 1000. The side plates 100 may be in a square shape as shown in FIG. 2, but the present invention is not limited to the specific shape of the side plates 100 and may be in various shapes.

The horizontal support bar 200 is a supporter configured in a long plate shape, and both longitudinal ends of the horizontal support bar 200 are coupled to the corners of the side plates 100 facing each other, between the side plates 100. For example, in an embodiment of FIG. 2, one end of a horizontal support bar 200 is coupled to a front top corner of a side plate 100 disposed at the left side, and the other end of the horizontal support bar 200 is coupled to a front top corner of a side plate 100 disposed at the right side. Also, one end of another horizontal support bar 200 is coupled to a rear bottom corner of the side plate 100 disposed at the left side and the other end thereof is coupled to a rear bottom corner of the side plate 100 disposed at the right side. Here, the horizontal support bars 200 may be coupled to the side plates 100 in various manners, such as bolt-coupling, or welding, but the present invention is not limited thereto.

The horizontal support bars 200 may have various shaped vertical cross-sections including an approximately square-shaped cross-section, but is not limited thereto.

As shown in FIG. 2, the four horizontal support bars 200 may consist of two upper horizontal support bars 220 and two lower horizontal support bars 210. In other words, two upper horizontal support bars 220 may be disposed at the top of the sub-battery container 1000, and two lower horizontal support bars 210 may be disposed at the bottom of the sub-battery container 1000.

The lower horizontal support bars 210 and the upper horizontal support bars 220 have uneven portions capable of coupling to each other at the bottom of the lower horizontal support bars 210 and the top of the upper horizontal support bars 220. Preferably, a concave portion is formed at the bottom of the lower horizontal support bars 210 and a convex portion is formed at the top of the upper horizontal support bars 220.

Figure 3:
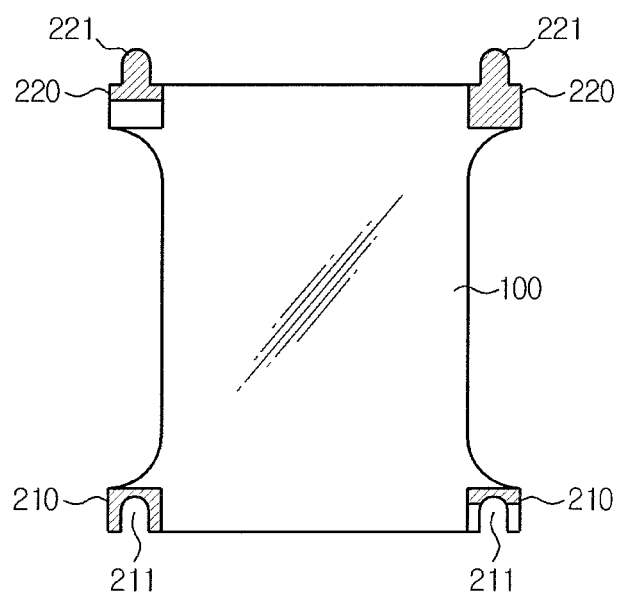
FIG. 3 is a cross-sectional view taken along the line A-A' of FIG. 2.

FIG. 3 is a cross-sectional view taken along the line A-A' of FIG. 2.

Referring to FIG. 3, the two upper horizontal support bars 220 have convex portions 221 at the top thereof and two lower horizontal support bars 210 have concave portions 211 at the bottom thereof. The convex portion 221 formed at the upper horizontal support bar 220 may be coupled to the concave portion 211 formed at the lower horizontal support bar 210 in the manner of inserting the convex portion into the concave portion. Such an uneven structure of the upper horizontal support bars 220 and the lower horizontal support bars 210 facilitates stacking of a plurality of the sub-battery containers 1000 and allows the stacked sub-battery containers 100 to have structural stability.

Preferably, among the four horizontal support bars 200 of the sub-battery container 1000, at least one horizontal support bar 200 has an opening 230. For example, the opening 230 may be formed in the lower horizontal support bar 210 and the upper horizontal support bar 220, as shown in FIG. 2. The opening 230 formed in the horizontal support bar 200 may improve ventilation in the sub-battery container 1000. That is, since external or internal air is actively introduced and discharged to/from the sub-battery container 1000 through the opening 230, the humidity and temperature around the battery modules which are received in the sub-battery container 1000 is appropriately lowered.

In addition, the opening 230 may be formed in the lower horizontal support bar 210 disposed rearwardly within the container or the upper horizontal support bar 220 disposed forwardly within the container, as being different from FIG. 2. Also, the opening 230 may be formed in all four horizontal support bars 220.

The side plates 100 and the horizontal support bars 200 may be made of various materials. Preferably, these are made of steel having high strength, but the present invention is not limited to the specific kind of material constituting the side plates 100 and the horizontal support bars 200. That is, various materials having high structural strength may be used as the side plates 100 and the horizontal support bars 200.

Meanwhile, although FIGS. 2 and 3 show that the uneven structures of the horizontal support bars 200 have convex portions at the top of the upper horizontal support bars 220 and concave portions at the bottom of lower horizontal support bars 210, the convex and concave portions may be reversed. That is, the uneven portions of the horizontal support bars 200 may be configured to have convex portions at the bottom of the lower horizontal support bars 210 and the concave portions at the top of the upper horizontal support bars 220.

Also, the uneven portions may be formed in various shapes, for example, one of the two upper horizontal support bars 220 is formed to have convex portions, while the other is formed to have concave portions, and the lower horizontal support bars 210 are formed to have the opposite configuration.

Figure 4:
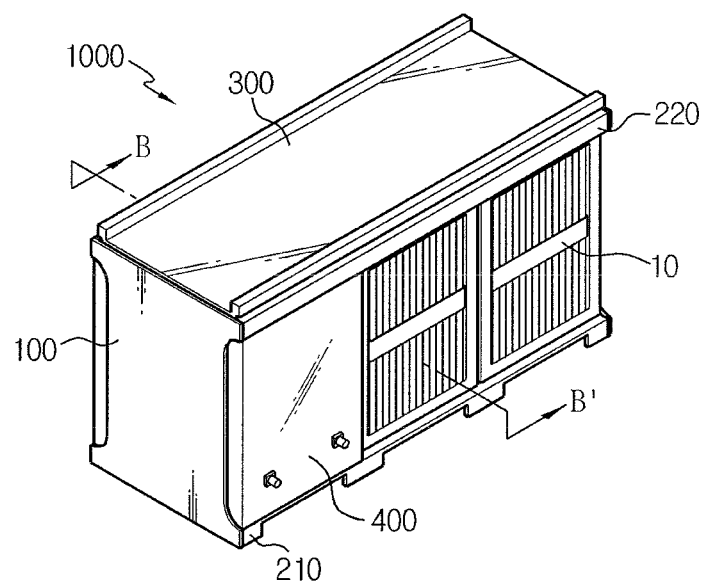
FIG. 4 is a front perspective view schematically showing a sub-battery container according to another embodiment of the present invention.

FIG. 4 is a front perspective view schematically showing a sub-battery container 1000 according to another embodiment of the present invention.

As shown in FIG. 4, the sub-battery container 1000 according to the present invention may include a top plate 300 at the top thereof. The top plate 300 has both ends fixed to the two upper horizontal support bars 220. If the sub-battery container 1000 includes the top plate 300 whose both ends are fixed to the upper horizontal support bars 220, as described above, the structural stability of the sub-battery container 1000 may be ensured. Of course, the top plate 300 may be fixed to the top portions of the side plates 100 instead of the upper horizontal support bars 220. In this case, the structural stability of the sub-battery container 1000 may be surely ensured.

Meanwhile, referring to FIG. 4, both ends of the top plate 300 may be fixed to the top of the upper horizontal support bars 220. In this case, it is preferred that the top plate 300 has an uneven portion capable of coupling to the bottom of the lower horizontal support bars 210, as shown in FIG. 4. More details of the above-mentioned embodiment will be more specifically described with reference to FIG. 5.

Figure 5:
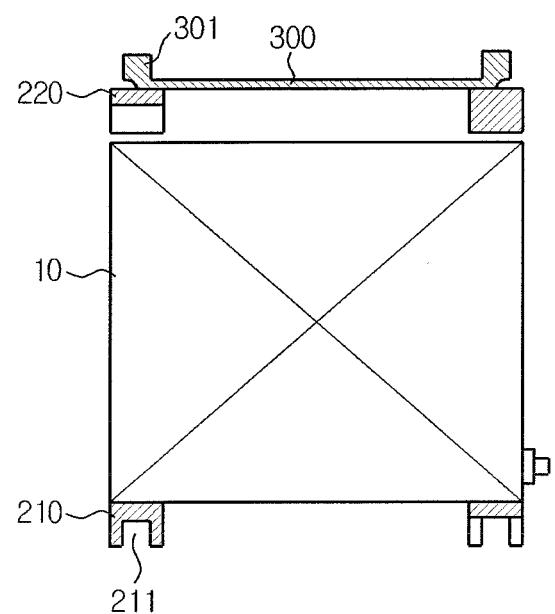
FIG. 5 is a cross-sectional view taken along the line B-B' of FIG. 4.

FIG. 5 is a cross-sectional view taken along the line B-W of FIG. 4.

Referring to FIG. 5, one end of the top plate 300 is fixed to the top of the upper horizontal support bar 220. However, instead of directly forming a convex portion at the upper horizontal support bars 220, a convex portion 301 is formed at the top plate 300, which is coupled to the top of the upper horizontal support bars 220. The convex portion 301 formed at the top plate 300 may be coupled to the concave portion 211 formed at the lower horizontal support bars 210. Therefore, when the two sub-battery containers 1000 are stacked, the concave portions 211 of the lower horizontal support bars 210 of the upper positioned sub-battery container 1000 may be inserted into the convex portion 301 of the top plate 300 of the lower positioned sub-battery container 1000, thereby fixing the sub-battery containers to each other.

Meanwhile, FIG. 4 shows that the sub-battery container receives three battery modules 10, but the number of the battery modules 10 capable of receiving in the sub-battery container 1000 may vary. At this time, each battery module 10 may be provided with a protection plate 400 as an external material, as shown in FIG. 4. Although FIG. 4 shows that the protection plate 400 is provided only for a single battery module 10 among the three battery modules 10 received in the sub-battery container 1000, the protection plate 400 may be provided for all three battery modules 10.

As shown in FIG. 4, when one or more battery modules 10 are received in a sub-battery container, the sub-battery container becomes a single independent sub-battery pack. Such an independent sub-battery pack is easily stacked with another one through uneven portions formed at the top and the bottom of the sub-battery container 1000. Accordingly, by stacking the plurality of sub-battery packs, a large-capacity battery pack, such as a power storage battery pack, may be easily configured. In addition, since each sub-battery pack included in a stack is also easily disassembled from the stack, when an entire capacity for battery packs needs to be reduced or abnormality of a battery pack is recognized, a part of the sub-battery packs may be easily removed from the battery pack.

Figure 6:
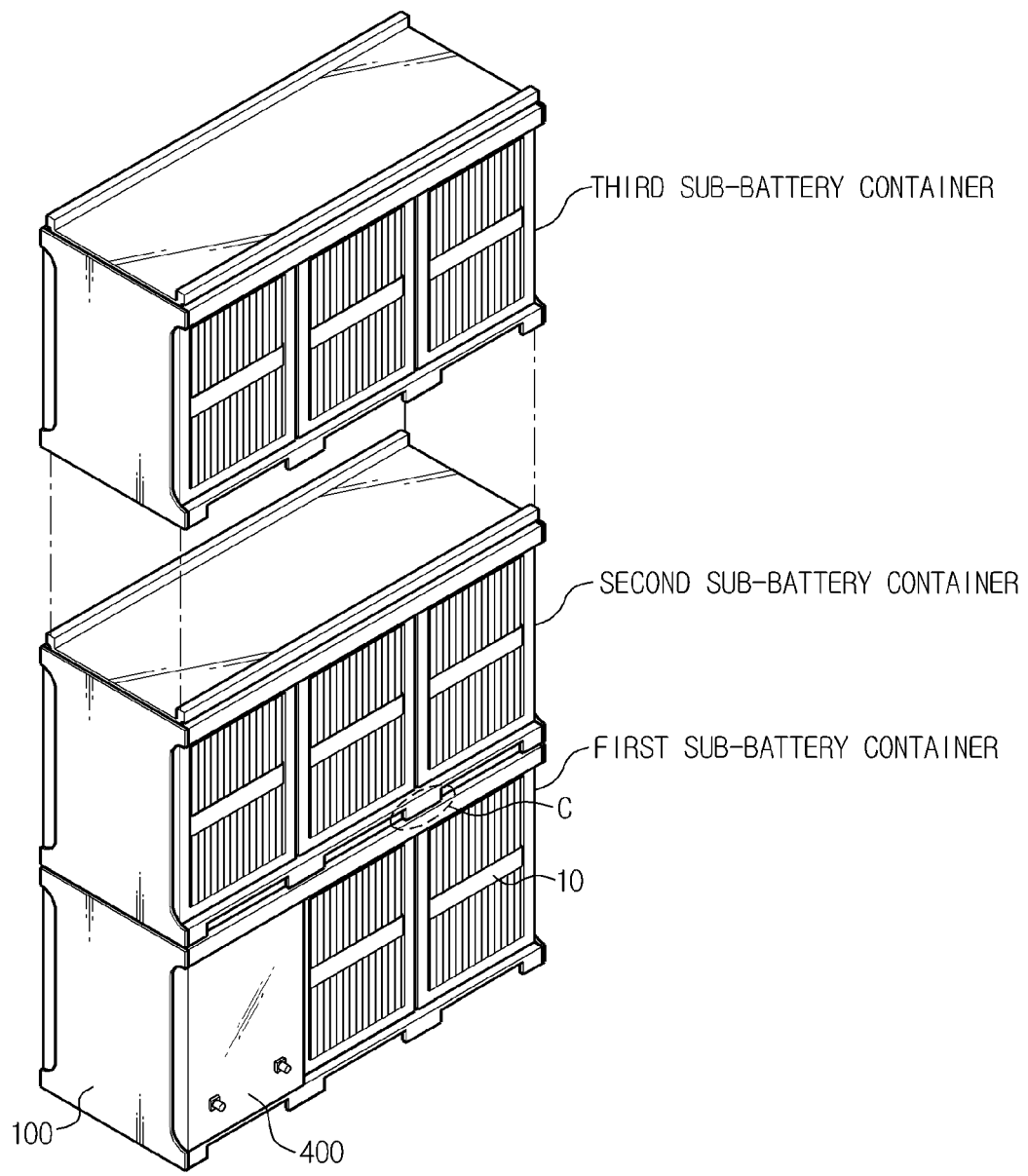
FIG. 6 is a perspective view schematically showing a process for configuring a battery container by stacking sub-battery containers according to an embodiment of the present invention.

FIG. 6 is a perspective view schematically showing a process for configuring a battery container by stacking sub-battery containers 1000 according to an embodiment of the present invention.

Referring to FIG. 6, the battery container of the present invention is configured by stacking two or more independent sub-battery containers 1000 one by one. That is, a second sub-battery container is stacked on top of a first sub-battery container and a third sub-battery container is stacked on top of the second sub-battery container, to configure the battery container. At this time, the sub-battery containers 1000 are stacked by coupling uneven portions formed at the bottom of the upper positioned sub-battery container and the top of the lower positioned sub-battery container. For example, the second sub-battery container may be stacked on top of the first sub-battery container by inserting the uneven portion formed at the top of the first sub-battery container into the uneven portion formed at the bottom of the second sub-battery container.

Figure 7:
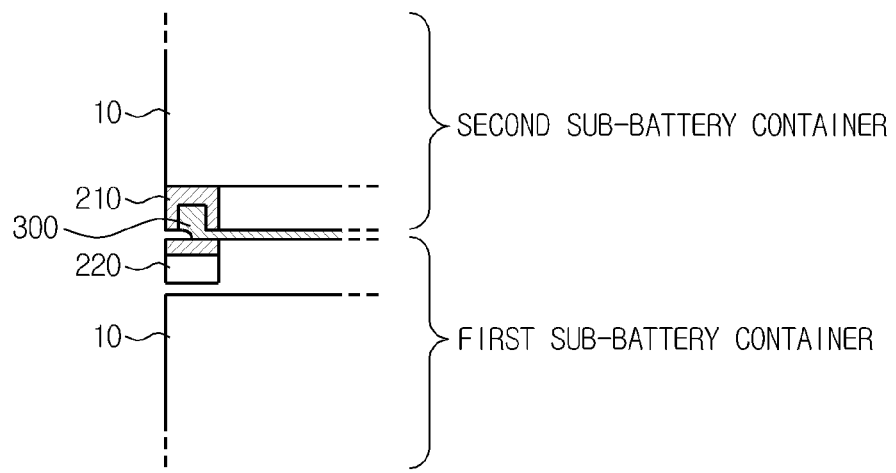
FIG. 7 shows Part C of FIG. 6, in which uneven portions are coupled at the top of a first sub-battery container and the bottom of a second sub-battery container according to an embodiment of the present invention.

FIG. 7 shows Part C of FIG. 6, in which uneven portions are coupled at the top of a first sub-battery container and the bottom of a second sub-battery container according to an embodiment of the present invention;

Referring to FIG. 7, a convex portion is formed at the top plate 300 of the first sub-battery container, and a convex portion is formed at the bottom of the lower horizontal support bar 210 of the second sub-battery container. Accordingly, when the second sub-battery container is stacked on top of the first sub-battery container, the convex portion formed at the top plate 300 of the first sub-battery container is inserted into the concave portion formed at the lower horizontal support bar 210 of the second sub-battery container. Therefore, the first and second sub-battery containers are easily stacked and the stack has structural stability through the uneven portions, as described above.

Meanwhile, the coupling structure of the uneven portion, shown in FIG. 7, is just an embodiment for the purpose of illustrations only, and various modifications and variations may be made.

Figure 8:
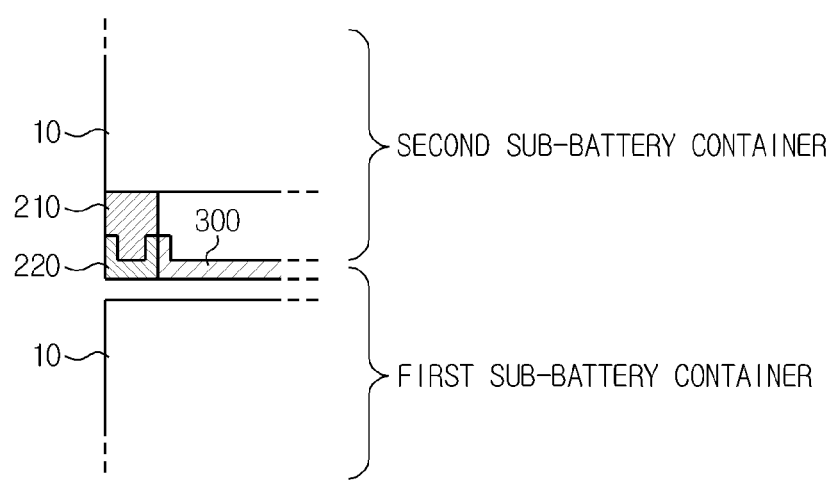
FIG. 8 shows Part C of FIG. 6, in which uneven portions are coupled at the top of a first sub-battery container and the bottom of a second sub-battery container according to another embodiment of the present invention.

FIG. 8 shows Part C of FIG. 6, in which uneven portions are coupled at the top of a first sub-battery container and the bottom of a second sub-battery container according to another embodiment of the present invention.

Referring to FIG. 8, a concave portion is formed at the upper horizontal support bar 220 of the first sub-battery container, and a convex portion is formed at the lower horizontal support bar 210 of the second sub-battery container. Accordingly, when the second sub-battery container is stacked on top of the first sub-battery container, the convex portion formed at the lower horizontal support bar 210 of the second sub-battery container, is inserted into the concave portion formed at the upper horizontal support bar 220 of the first sub-battery container.

Meanwhile, although FIG. 6 shows only a single protection plate 400 for a battery module 10, the protection plate 400 may be provided for all the battery modules 10.

In addition, although FIGS. 6 to 8 show that the battery modules 10 are received in the sub-battery container before the sub-battery containers are stacked to each other, the battery modules 10 may be received in the sub-battery container after the sub-battery containers are stacked to each other.

Figure 9:
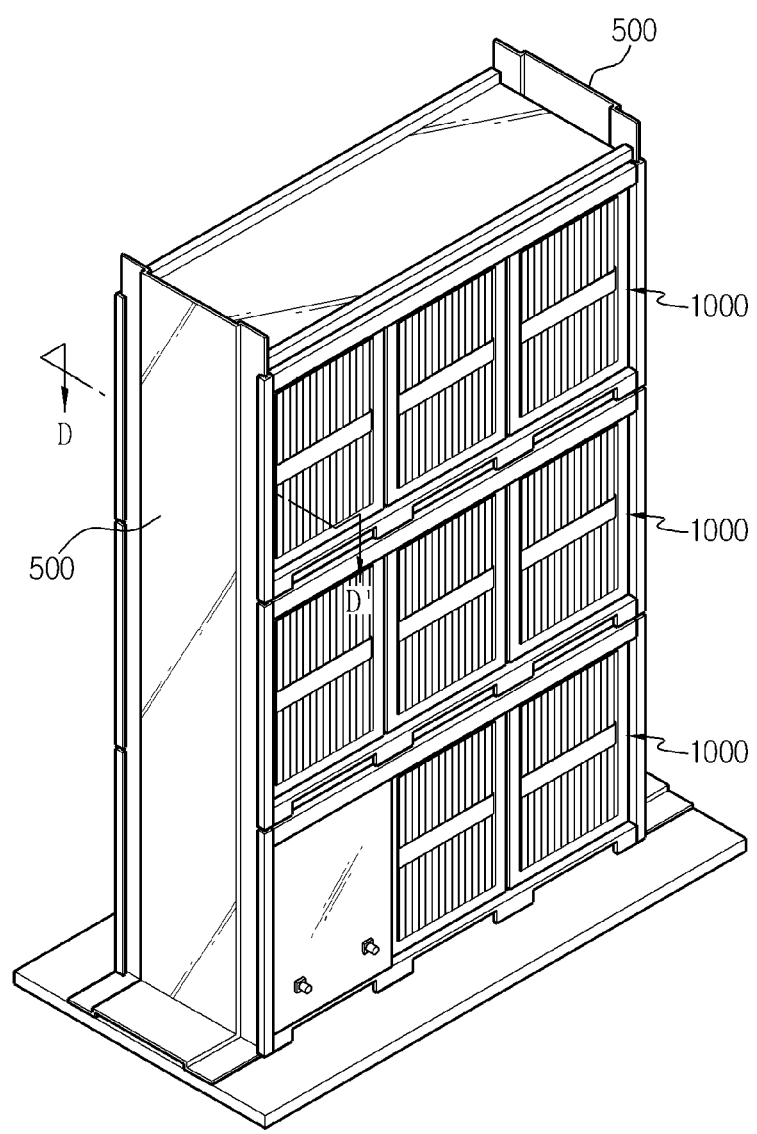
FIG. 9 is a front perspective view schematically showing a battery container according to an embodiment of the present invention.

FIG. 9 is a front perspective view schematically showing a battery container according to an embodiment of the present invention.

When the sub-battery containers 1000 are stacked in the manner of mutually coupling the uneven portions formed at the top or the bottom of each sub-battery container, as shown in FIG. 6, the battery container of FIG. 9 may be configured.

Referring to FIG. 9, the battery container according to the present invention is configured by stacking a plurality of independent sub-battery containers 1000 in which battery modules 10 are received. At this time, each sub-battery container 1000 may be coupled to another one in various manners as shown in FIG. 7 or FIG. 8, as being described above. According to the present invention, since the battery container is formed by simply stacking the independently separate sub-battery containers 1000 with another one, it is easy to assemble and disassemble the battery container. That is, when the conventional battery container changes its structure by adding or removing battery modules 10 after the conventional battery containers are stacked, it is very complicated to disassemble and reassemble the conventional battery container. However, according to the present invention, although the sub-battery containers are stacked to configure a battery container, a new sub-battery container 1000 is simply added on top of the battery container or removed from the battery container, thereby making it easy to change the structure of the battery container. Therefore, the battery pack capacity using the sub-battery container can be easily changed.

Preferably, the battery container according to the present invention further includes a fixing plate 500. When the plurality of sub-battery containers 100 are stacked, the fixing plate 500 is coupled to the external of the side plates 100 of each sub-battery container 1000, as shown in FIG. 9.

Figure 10:
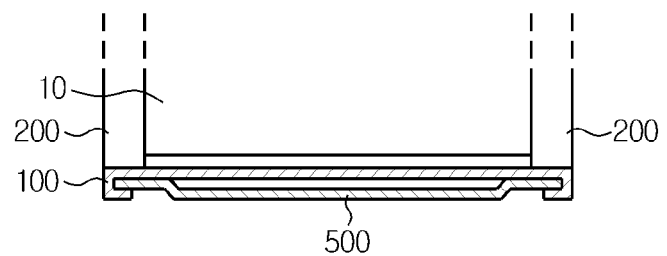
FIG. 10 is a cross-sectional view showing an example of a coupling structure between a fixing plate and a side plate in a battery container according to the present invention.

FIG. 10 is a cross-sectional view showing a coupling structure between the fixing plate 500 and the side plate 100 in the battery container according to the present invention. That is, FIG. 10 shows a cross-sectional view taken along the line D-D' of FIG. 9.

Referring to FIG. 10, both ends of the side plate 100 are in a C shape, and concave portions are formed thereat. Then, both ends of the fixing plate 500 are inserted into the concave portions of the side plate 100, described above, thereby coupling the fixing plate 500 to the side plate 100. When the fixing plate 500 is coupled to the side plate 100 as described above, after the sub-battery containers 1000 are stacked, the fixing plate 500 may be fixed to the stack by downwardly inserting the fixing plate 500 from the uppermost of the stacked sub-battery containers 1000. Also, after the fixing plate 500 is standing and fixed in a vertical direction, the sub-battery containers 1000 may be fixed to the fixing plate 500 by downwardly inserting the sub-battery containers 1000 from the top of the fixing plate 500. Various modifications and variations can be made on the coupling between the fixing plate and the side plate 100. Also, FIG. 9 shows that two fixing plates 500 are provided at both sides of the battery container, but a single fixing plate 500 may be provided in the battery container.

However, the coupling structure between the fixing plate 500 and the side plate 100 shown in FIG. 10 is just an embodiment, and various modifications and variations can be made on the coupling structure between the fixing plate 500 and the side plate 100, as being obvious those skilled in the art. For example, the fixing plate 500 may be mutually coupled to the side plate 100 by using fixing members, such as bolts, caps, or the like.

As described above, when the fixing plate 500 is provided at the side of the battery container to fix the side plates 100 of each sub-battery container 1000, the fixing plate 500 laterally supports each sub-battery container 1000, so that the structure of the entire battery container may be reinforced.

A battery pack according to the present invention is configured by receiving the plurality of battery modules 10 in the battery container, described above. That is, as shown in FIG. 10, the battery modules 10 are received in the battery container of the present invention to configure a battery pack. The battery pack according to the present invention may increase the capacity of the battery pack by simply stacking a new sub battery pack, in which battery modules 10 are received in the sub-battery container 1000, on top of the existing battery pack. Therefore, the battery pack according to the present invention may be effectively used to configure a power storage battery pack which stacks multiple battery modules 10 therein.

Meanwhile, although FIGS. 4 to 9 show the sub-battery container 1000 including the top plate 300 in their embodiment, a bottom plate may be included in the sub-battery container 100, instead of the top plate 300. In this case, an uneven portion does not form directly at the bottom of the lower horizontal support bars 210 and instead, may be formed at the bottom plate. The uneven portion, which is formed at the bottom plate, may couple to the uneven portion formed at the upper horizontal support bars 220 of the lower positioned sub-battery container 1000, while stacking the sub-battery containers. Also, the sub-battery container 1000 according to the present invention may include the top plate 300 together with the bottom plate.

In addition, the above-mentioned embodiments are described based on that the sub-battery container 1000 includes four horizontal support bars 200 constituting two upper horizontal support bars 220 and two lower horizontal support bars 210, but the present invention is not limited to the specific number of the horizontal support bars 200, as described above.

INDUSTRIAL APPLICABILITY

The present invention has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A sub-battery container used in a battery container for receiving a plurality of battery modules, the sub-battery container comprising:
   two side plates standing to face each other at both side walls of the sub-battery container; and
   horizontal support bars disposed in parallel,
   wherein one longitudinal end of each horizontal support bar is coupled to one side plate of the two side plates and the other longitudinal end of each horizontal support bar is coupled to the other side plate of the two side plates such that each horizontal support bar is perpendicularly coupled to the two side plates,
   wherein the horizontal support bars include an upper horizontal support bar and a lower horizontal support bar disposed under the upper horizontal support bar,
   wherein the lower horizontal support bar and the upper horizontal support bar have uneven portions, respectively,
   wherein an uneven portion of the lower horizontal support bar is formed at a bottom of the lower horizontal support bar and an uneven portion of the upper horizontal support bar is formed at a top of the upper horizontal support bar such that a convex portion of one of the uneven portions is inserted into a concave portion of the other one thereof when two sub-battery containers are stacked, and
   wherein opposite ends of each of the two side plates are bent in a C shape to form concave portions to receive a fixing plate to be inserted into the concave portions.

2. The sub-battery container used in a battery container according to claim 1, further comprising a top plate whose both ends are fixed to the top of the upper horizontal support bars.

3. The sub-battery container used in a battery container according to claim 1, wherein the uneven portions have a convex portion formed at the top of the upper horizontal support bar and a concave portion formed at the bottom of the lower horizontal support bar.

4. The sub-battery container used in a battery container according to claim 1, wherein the uneven portions have a convex portion formed at the bottom of the lower horizontal support bar and a concave portion formed at the top of the upper horizontal support bar.

5. The sub-battery container used in a battery container according to claim 1, wherein at least one of the horizontal support bars has an opening.

6. The sub-battery container used in a battery container according to claim 1, further comprising another upper horizontal support bar and another lower horizontal support bar to provide two upper horizontal support bars and two lower horizontal support bars.

7. A battery container for receiving a plurality of battery modules, comprising:
a plurality of sub-battery containers including two side plates standing to face each other at both side walls thereof; and
horizontal support bars disposed in parallel,
wherein one longitudinal end of each horizontal support bar is coupled to one side plate of the two side plates and the other longitudinal end of each horizontal support bar is coupled to the other side plate of the two side plates such that each horizontal support bar is perpendicularly coupled to the two side plates,
wherein the horizontal support bars include an upper horizontal support bar and a lower horizontal support bar disposed under the upper horizontal support bar,
wherein the lower horizontal support bar and the upper horizontal support bar have uneven portions, respectively,
wherein an uneven portion of the lower horizontal support bar is formed at a bottom of the lower horizontal support bar and an uneven portion of the upper horizontal support bar is formed at a top of the upper horizontal support bar,
wherein the plurality of sub-battery containers are stacked by mutually coupling such that one sub-battery container is stacked on top of another sub-battery container adjacent said one sub-battery container such that the uneven portion of the lower horizontal support bar of said sub-battery container and the uneven portion of the upper horizontal support bar of said another sub-battery container mesh with each other,
wherein opposite ends of each of the two side plates are bent in a C shape to form concave portions, and
wherein the battery container further comprises two fixing plates inserted into the concave portions of the sides plates at opposite ends of the battery container along a stacking direction of the sub-battery containers.

8. The battery container according to claim 7, wherein the upper horizontal support bar is provided in plurality, and
wherein each sub-battery container further includes a top plate whose both ends are fixed to the top of the upper horizontal support bars.

9. The battery container according to claim 7, wherein the uneven portions have a convex portion formed at the top of the upper horizontal support bar and a concave portion formed at the bottom of the lower horizontal support bar.

10. The battery container according to claim 7, wherein the uneven portions have a convex portion formed at the bottom of the lower horizontal support bar and a concave portion formed at the top of the upper horizontal support bar.

11. The battery container according to claim 7, wherein at least one of the horizontal support bars included in each sub-battery container has an opening.

12. The battery container according to claim 7, wherein each sub-battery container includes another upper horizontal support bar and another lower horizontal support bar to provide two upper horizontal support bars and two lower horizontal support bars.

13. A battery pack, comprising a plurality of battery modules received in the battery container defined in claim 7.

* * * * *